US008346845B2

(12) United States Patent
Khandekar et al.

(10) Patent No.: US 8,346,845 B2
(45) Date of Patent: Jan. 1, 2013

(54) DISTRIBUTED SOLUTIONS FOR LARGE-SCALE RESOURCE ASSIGNMENT TASKS

(75) Inventors: Rohit M. Khandekar, Elmsford, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/760,080

(22) Filed: Apr. 14, 2010

(65) Prior Publication Data

US 2011/0258246 A1    Oct. 20, 2011

(51) Int. Cl.
*G06F 15/16* (2006.01)
(52) U.S. Cl. ........ 709/201; 709/205; 709/221; 709/223; 709/226
(58) Field of Classification Search .................. 709/201, 709/205, 221, 223, 226
See application file for complete search history.

(56) References Cited

U.S. PATENT DOCUMENTS

| | | | |
|---|---|---|---|
| 6,009,455 | A | 12/1999 | Doyle |
| 6,922,681 | B2 | 7/2005 | Fromherz et al. |
| 7,461,038 | B2 | 12/2008 | Kropaczek et al. |
| 2001/0025351 | A1 | 9/2001 | Kursawe et al. |
| 2003/0005068 | A1 | 1/2003 | Nickel et al. |
| 2004/0221038 | A1 | 11/2004 | Clarke, Jr. et al. |
| 2008/0301405 | A1 | 12/2008 | Kaufman et al. |
| 2009/0070402 | A1* | 3/2009 | Rose et al. ............ 709/201 |
| 2009/0182814 | A1* | 7/2009 | Tapolcai et al. ............ 709/205 |
| 2009/0228419 | A1 | 9/2009 | Kelly et al. |

OTHER PUBLICATIONS

Papadimitriou, Christos H. et al., "Linear Programming Without The Matrix," STOC, 1993, pp. 121-129.
Dolev, Shlomi et al., "Self Stabilization of Dynamic Systems Assuming Only Read/Write Atomicity," PODC, 1990, pp. 1-31.
Awerbuch, Baruch et al., "Distributed Program Checking: a Paradigm for Building Self-stabilizing Distributed Protocols," FOCS, 1991, pp. 258-267.
Tseng, Paul; "Distributed Computation for Linear Programming Problems Satisfying Certain Diagonal Dominance Condition," Mathematics of Operations Research, vol. 15, No. 1, pp. 33-48.
Dean, Jeffrey & Sanjay Ghemawat, "MapReduce: Simplified Data Processing on Large Clusters," Proc. 6th OSDI, Dec. 2004, pp. 137-150.
Awerbuch, Baruch & Yossi Azar, "Local Optimization of Global Objectives: Competitive Distributed Deadlock Resolution and Resource Allocation," In Proceedings of the 35th IEEE Symposium on Foundations of Computer Science, 1994, pp. 240-249.
Awerbuch, Baruch, Yossi Azar & Rohit Khandekar, "Fast Load Balancing via Bounded Best Response," Proceedings of the Nineteenth Annual ACM-SIAM Symposium on Discrete Algorithms, SODA 2008, San Francisco, California, USA, Jan. 20-22, 2008, pp. 314-312.
Awerbuch, Baruch & Rohit Khandekar, "Stateless Near Optimal Flow Control with Poly-logarithmic Covergence," Proceedings, 8th Latin American Theoretical Informatics (LATIN), 2008, pp. 1-12.

(Continued)

*Primary Examiner* — Wing Chan
*Assistant Examiner* — Benjamin M Thieu
(74) *Attorney, Agent, or Firm* — William Stock, Esq.; Blanche E. Schiller, Esq.; Heslin Rothenberg Farley & Mesiti P.C.

(57) ABSTRACT

Distributed data processing of problems representing resource assignment tasks. The problems are modeled as programs, and the programs are partitioned into sub-instances. Those sub-instances are executed in a distributed computing environment. The partitioning reduces communication costs between sub-instances and convergence time for the optimization program.

14 Claims, 8 Drawing Sheets

OTHER PUBLICATIONS

Awerbuch, Baruch & Rohit Khandekar, "Greedy Distributed Optimization of Multi-Commodity Flows," Proceedings, 26th Annual ACM SIGACT-SIGOPS Symposium on Principles of Distributed Computing (PODC), 2007, pp. 1-10.

Awerbuch Baruch & Rohit Khandekar, "Distributed Network Monitoring and Multicommodity Flows: A Primal-Dual Approach," Proceedings, 26th Annual ACM SIGACT-SIGOPS Symposium on Principles of Distributed Computing (PODC), 2007, pp. 1-8.

Awerbuch, Baruch & Rohit Khandekar, "Stateless Distributed Gradient Descent for Positive Linear Programs," Proceedings of the 40th Annual ACM Symposium on Theory of Computing, 2009, pp. 1-10.

Awerbuch, Baruch, Rohit Khandekar & Satish Rao, "Distributed Algorithms for Multicommodity Flow Problems via Approximate Steepest Descent Framework," Proceedings of the Eighteenth Annual ACM-SIAM Symposium on Discrete Algorithms, 2007, pp. 1-9.

Awerbuch, Baruch, Boaz Patt-Shamir & George Varghese, "Self-Stabilization by Local Checking and Correction," Proc. 32nd IEEE Conf. on Foundations of Computer Science, 1991, pp. 1-10.

Bartal, Yair, John W. Byers & Danny Raz, "Global Optimization Using Local Information with Applications to Flow Control," Proceedings of the 38th Annual Symposium on Foundations of Computer Science, 1997, pp. 1-10.

Dijkstra, Edsger W., "Self-stabilizing Systems in Spite of Distributed Control," Communications of the ACM, Nov. 1974, vol. 17, No. 11, pp. 643-644.

Fleischer, Lisa K., "Approximating Fractional Multicommodity Flow Independent of the Number of Commodities," SIAM Journal on Discrete Mathematics, vol. 13, Issue 4, 2000, pp. 505-520.

Garg, Naveen & Jochen Könemann, "Faster and Simpler Algorithms for Multicommodity Flow and Other Fractional Packing Problems," SIAM Journal on Computing, vol. 37, Issue 2, (May 2007), pp. 630-652.

Garg, Naveen & Neal E. Young, "On-Line End-to-End Congestion Control," FOCS Proceedings of the 43rd Symposium on Foundations of Computer Science, 2002, pp. 303-312.

Gouda, Mohamed G. & Nicholas J. Multari, "Stabilizing Communication Protocols," Technical Report: CS-TR-90-20, University of Texas at Austin, 1990.

Koufogiannakis, Christos & Neal E. Young, "Beating Simplex for Fractional Packing and Covering Linear Programs," FOCS Proceedings of the 48th Annual IEEE Symposium on Foundations of Computer Science, 2007, pp. 494-504.

Kuhn, Fabian, "The Price of Locality: Exploring the Complexity of Distributed Coordination Primitives," PhD Thesis, ETH Zurich, Diss. ETH No. 16213, Dec. 2005.

Kuhn, Fabian, Thomas Moscibroda & Roger Wattenhofer, "The Price of Being Near-Sighted," Symposium on Discrete Algorithms Proceedings of the Seventeenth Annual ACM-SIAM Symposium on Discrete Algorithm, Miami, Florida, 2006, pp. 980-989.

Kuhn, Fabian & Roger Wattenhofer, "Constant-Time Distributed Dominating Set Approximation," Annual ACM Symposium on Principles of Distributed Computing, Proceedings of the Twenty-Second Annual Symposium on Principles of Distributed Computing, Boston, Massachusetts, 2003, pp. 25-32.

Luby, Michael & Noam Nisan, "A Parallel Approximation for Algorithm for Positive Linear Programming," Annual ACM Symposium on Theory of Computing, Proceedings of the Twenty-Fifth Annual ACM Symposium on Theory of Computing, San Diego, California, United States, 1993, pp. 448-457.

Naor, Moni & Larry Stockmeyer, "What Can Be Computed Locally?" SIAM Journal on Computing, vol. 24, Issue 6, Dec. 1995, pp. 1259-1277.

Plotkin, Serge A., Daivd B. Shmoys & Eva Tardos, "Fast Approximation Algorithms for Fractional Packing and Covering Problems," Mathematics of Operations Research, vol. 20, Issue 2, May 1995, pp. 257-301.

Young, Neal E., "Sequential and Parallel Algorithms for Mixed Packing and Covering," 42nd IEEE symposium on Foundations of Computer Science, 2001, pp. 538-546.

\* cited by examiner

Minimize: $10x(1) + 2x(2) - 15x(3) - 3x(4) \quad + 5x(6) - 2x(7)$

Subject to:

402 — BLOCKS:

| | | |
|---|---|---|
| $-3x(1) + 4x(2)$ | $\leq$ | $-20$ |
| $8x(1) - 2x(2)$ | $=$ | $45$ |
| $x(1)$ | $\geq$ | $0$ |
| $3x(3) + 21x(4)$ | $\leq$ | $64$ |
| $-4x(3) + x(4)$ | $\geq$ | $-2$ |
| $4x(5) + 3x(6) + 2x(7)$ | $=$ | $21$ |
| $-3x(5) - 2x(6) + x(7)$ | $\leq$ | $14$ |
| $4x(5) \qquad\quad + x(7)$ | $\leq$ | $3$ |
| $x(6)$ | $\leq$ | $0$ |

404 — COUPLING CONSTRAINTS:

| | | |
|---|---|---|
| $10x(1) + 2x(2) - 15x(3) - 3x(4) \quad + x(6) - 2x(7)$ | $=$ | $21$ |
| $10x(1) + 2x(2) - 15x(3) + x(4) + 3x(5) + 2x(6) - 2x(7)$ | $\geq$ | $-43$ |

FIG. 4B

Minimize: $10x(1) + 2x(2) \mid -15x(3) + 3x(4) \mid \quad \mid -5x(6) - 2x(7)$

Subject to:

| H1 | H2 | H3 | H4 | | | |
|---|---|---|---|---|---|---|
| $-3x(1) + 4x(2)$ | | | | $\leq$ | $-20$ | H1 |
| $8x(1) - 2x(2)$ | | | | $=$ | $45$ | |
| $x(1)$ | | | | $\geq$ | $0$ | |
| | $3x(3) + 21x(4)$ | | | $\leq$ | $64$ | H2 |
| | $-4x(3) + x(4)$ | | | $\geq$ | $-2$ | |
| | | $4x(5) + 3x(6) + 2x(7)$ | | $=$ | $21$ | H3 |
| | | $-3x(5) - 2x(6) + x(7)$ | | $\leq$ | $14$ | |
| | | $4x(5) \quad\quad + x(7)$ | | $\leq$ | $3$ | |
| | | $x(6)$ | | $\leq$ | $0$ | |
| $10x(1) + 2x(2)$ | $-15x(3) - 3x(4)$ | | $+ x(6) - 2x(7)$ | $=$ | $21$ | H4 |
| $10x(1) - 2x(2)$ | $-15x(3) + x(4)$ | $+ 3x(5)$ | $+ 2x(6) + 3x(7)$ | $\geq$ | $-43$ | H5 |

DISTRIBUTED SOLUTIONS FOR LARGE-SCALE RESOURCE ASSIGNMENT TASKS

BACKGROUND

This invention relates, in general, to distributed data processing, and in particular, to distributed solutions for problems arising from large-scale resource assignment tasks.

Due to emerging technologies in computing and communications, current day machines are able to collect, store, and handle large-scale data. As a result, the size of problems, such as optimization problems, arising, for example, from resource assignment tasks, such as scheduling, load balancing, resource allocation, and pricing, are becoming larger and larger, as well. The problems often become so large that they cannot be stored, let alone solved, on a single compute node.

Therefore, to solve these problems, multiple compute nodes are used. When multiple compute nodes are involved in a solution, however, fault tolerance often becomes an issue, as well as communications overhead and inefficiencies.

Moreover, often the problems are dynamic in nature—the parameters of the problems change over time, e.g., decision variables are added or removed, constraints or objective functions of the problem are added or removed, etc. These changes typically require a restart of the computation, leading to inefficiencies.

BRIEF SUMMARY

The shortcomings of the prior art are overcome and additional advantages are provided through the provision of a method of facilitating data processing in a distributed computing environment. The method includes, for instance, partitioning, by a processor executing on a node of the distributed computing environment, a program that represents a resource assignment task into a plurality of sub-instances, the partitioning reducing communication costs between the sub-instances and reducing convergence time for the program; and assigning the plurality of sub-instances to a plurality of nodes of the distributed computing environment, the plurality of nodes to execute the plurality of sub-instances to obtain a result for the resource assignment task.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4A-4B pictorially depict the splitting of a linear program into multiple sub-instances, in accordance with an aspect of the present invention;

DETAILED DESCRIPTION

Figure 1A:
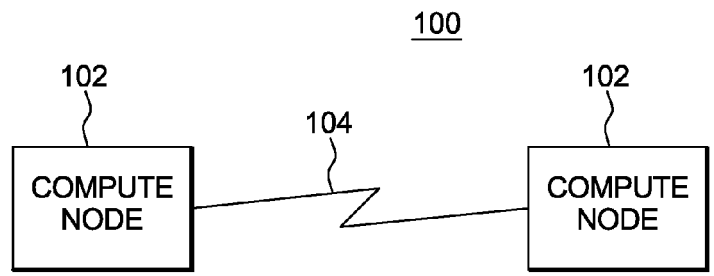
FIG. 1A depicts one embodiment of a distributed computing environment to incorporate and use one or more aspects of the present invention.

In accordance with an aspect of the present invention, a capability is provided for facilitating distributed data processing of programs, including optimization programs. These programs represent problems (e.g., optimization problems) arising from resource assignment tasks, such as scheduling, load balancing, resource allocation and pricing, as examples. To efficiently execute these programs and obtain solutions for the resource assignment tasks, these programs are partitioned into sub-instances (e.g., sub-programs) and those sub-instances are executed in a distributed computing environment.

As one example, a distributed optimization program is provided, in which sub-instances of the program are stored and processed on different compute nodes connected by a communications network. Such a distributed optimization program does not require maintaining a global consistent state during the computation. It also tolerates a node or a link failure without the need to restart the computation from scratch. It is able to respond to dynamic changes in the problem and failures of individual compute nodes or the communication infrastructure without needing to restart the entire computation. Moreover, in one aspect, the program is able to converge to optimal or near-optimal solutions quickly.

The solution produced by executing the sub-instances solves the optimization problem arising from the resource assignment task. For illustrative purpose, optimization problems arising from two resource assignment tasks are described in further detail below. Although two problems relating to two tasks are described, it is clear that many others exist and can benefit from one or more aspects of the present invention.

One example of a resource assignment task is an ad-revenue maximization task for the modern day web search engines. A typical web search engine searches web pages based on keyword queries. When given a query, it displays a collection of web pages relevant to the query. Along with the search results, however, it also displays certain sponsored content. The advertisers, who sponsor this content, have a fixed daily advertising budget and bid on one or more keywords relevant to their interest. The question of which advertisements should be displayed for a given search query can be formulated as an optimization problem, which is modeled as an optimization program. It is the search engine companies, such as Google, Yahoo and Microsoft, which need to solve this optimization program in order to maximize the overall revenue generated by the advertisements. Daily, several million keyword searches take place on popular search engines and millions of advertisers bid on these keywords. Solving such a large-scale problem is a daunting task for the search engine companies.

Another example of a resource assignment task is a load-balancing task for Internet web servers, such as popular websites, Internet relay chat networks, Network News Transfer Protocol (NNTP) servers and Domain Name Service (DNS) servers. Load balancing is a technique to distribute workload evenly among two or more servers, in order to get optimal resource utilization (of, e.g., the physical resources), maximize throughput, minimize response time and avoid overload. This task can also be formulated as an optimization problem, which is modeled as an optimization program. With more and more traffic being received by web servers, increasing sizes of server farms and more performance data being available to use, the load-balancing problem is becoming larger and larger in size.

The program representing a resource assignment task is executed and solved, optimally or near-optimally, in a distributed computing environment by effectively storing and processing parts of the program on different compute nodes connected by a communications interface.

One example of such a distributed computing environment is depicted in FIG. 1A. Referring to FIG. 1A, a distributed computing environment 100 includes, for instance, two or more compute nodes 102 coupled to one another via at least one network 104. As examples, network 104 is a wide area network (WAN), a local area network (LAN), a token ring, etc. Although two compute nodes are depicted herein, it is understood that in other embodiments, more than two compute nodes, even hundreds or thousands, may be coupled in a network and used in one or more aspects of the present invention.

Figure 1B:
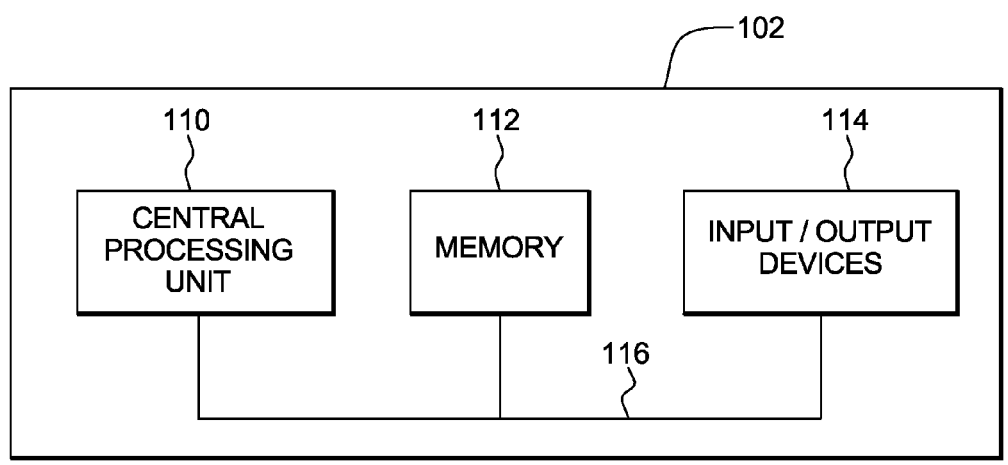
FIG. 1B depicts one embodiment of various components of a compute node of FIG. 1A, in accordance with an aspect of the present invention.

In one embodiment, as shown in FIG. 1B, at least one of the compute nodes 102 includes, for instance, one or more central processing units 110, a memory 112, and one or more input/output devices 114 coupled to one another via one or more buses 116. Compute node 102 is, for instance, a System p®, System x® or System z® server offered by International Business Machines Corporation, and may have an operating system, such as z/OS®, offered by International Business Machines Corporation, or other operating system executing thereon. System p®, System x®, System z®, and z/OS® are registered trademarks of International Business Machines Corporation, Armonk, New York. Other names used herein may be registered trademarks, trademarks or product names of International Business Machines Corporation or other companies.

Other compute nodes of the network may have the same or different attributes. That is, they can be of the same or different architecture; have the same, different or even no operating system; and/or can have the same or different components. Many variations are possible.

The compute nodes work together to execute an optimization program (or other program) that represents a real-world task, such as a resource assignment task. In one example, a program (e.g., an optimization program) is described by one or more decision variables, each lying in a certain domain, one or more objective functions of the variables, and one or more constraints on the decision variables. One goal is to find an assignment of values to the variables from the corresponding domains, such that the constraints are satisfied and the objective function is optimized. Commonly used models for optimization programs are mathematical programs, such as linear programs, mixed integer linear programs, and convex programs, as examples. A linear program involves real valued variables, a linear objective function, and linear constraints. A mixed integer linear program involves real valued and integer valued variables, a linear objective function, and linear constraints. A convex program involves real valued variables, a convex objective function, and convex constraints. The size of an optimization program denotes the size of the description of the program, e.g., the total number of variables and constraints, if the optimization program is explicitly given.

To efficiently execute such a program to solve a resource assignment task, the program is partitioned and distributively executed, as described with reference to FIG. 2. In one example, the partitioning and other aspects related to the distributed execution of the program are performed and/or managed by a node of the computing environment selected as a master node.

Figure 2:
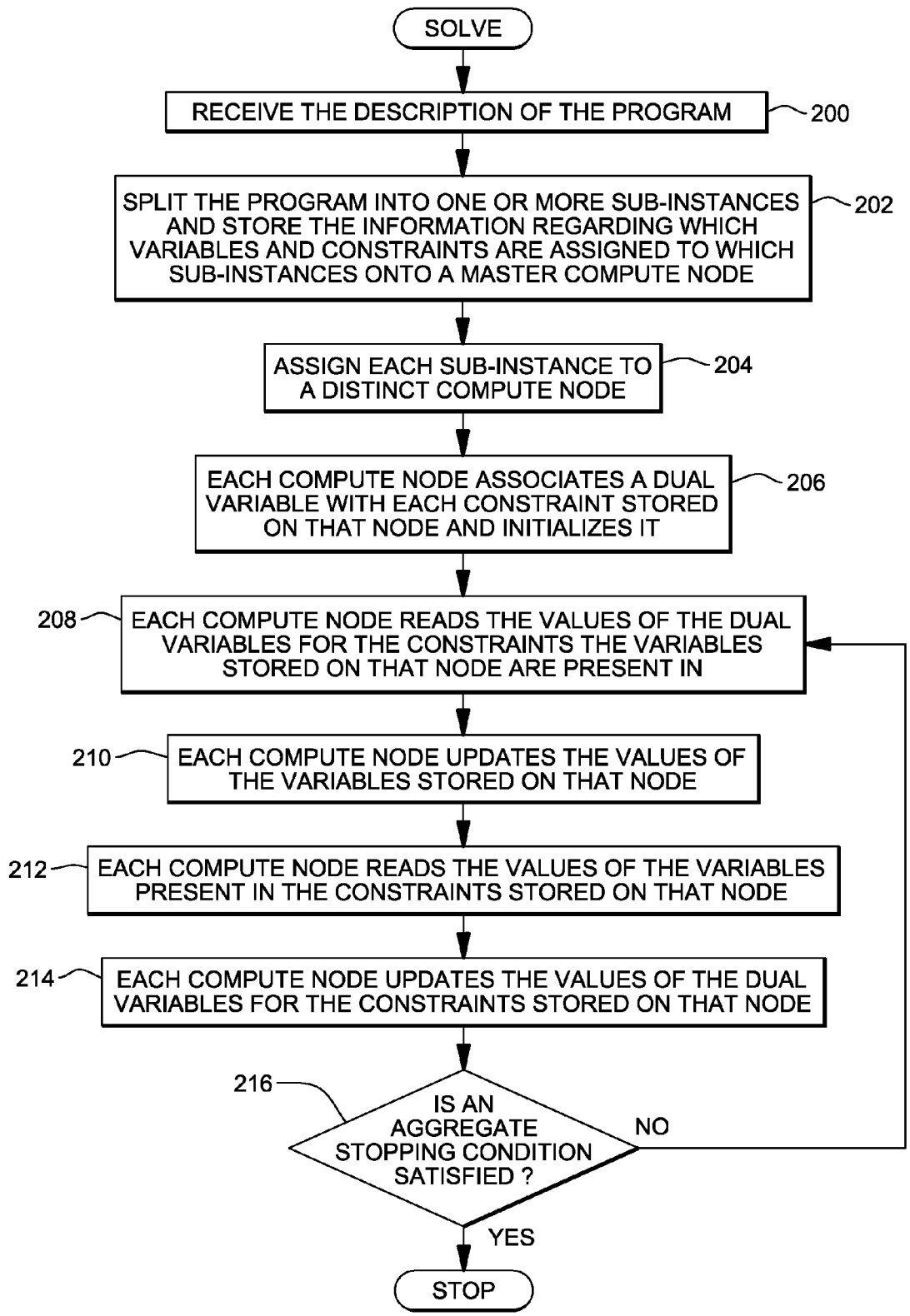
FIG. 2 depicts one embodiment of the logic used to provide a solution for a resource assignment task, in accordance with an aspect of the present invention.

Referring to FIG. 2, initially, a description of the program (e.g., optimization program) is obtained (e.g., received, created, has) by the master node, STEP 200. The program is then split into two or more sub-instances (e.g., sub-programs), STEP 202. Each sub-instance includes, for instance, a subset of variables, a subset of constraints and a subset of objective functions from the original program. Information regarding which variables and constraints are assigned to which sub-instances are stored on the master node, as one example.

Thereafter, the sub-instances are assigned to two or more compute nodes, STEP 204. In one example, each sub-instance is assigned to a different compute node. However, in other embodiments, multiple sub-instances may be assigned to one node, or one sub-instance may be split among two or more nodes.

The partitioning is performed such that certain objectives are achieved, including, for instance, the size of each sub-instance is small enough so that it can be stored and effectively processed on the compute node to which it is assigned; and the overall communication overhead between multiple compute nodes while solving the program is small.

Each compute node associates a dual (e.g., penalty) variable with each constraint stored on that node and initializes it, STEP 206. Further, each compute node reads, from other compute nodes, values of the dual variables for the constraints the variables stored on that node are present in, STEP 208. Each compute node updates the values of the variables stored on that node, STEP 210. Additionally, each compute node reads the values of the variables present in the constraints stored on that node, STEP 212. Each compute node updates the values of the dual variables for the constraints stored on that node, STEP 214.

Thereafter, a determination is made as to whether an aggregate stopping condition is satisfied, INQUIRY 216. If not, then processing continues with STEP 208. Otherwise, the distributive processing of the program is complete.

Further details regarding an optimization program and the steps taken to solve such a program are described below. As described herein, an optimization program may be, for instance, a linear program, an integer linear program or a convex program. Particular examples are as follows:

Consider a linear program (LP) of the form
Maximize $\{c \cdot x \text{ subject to } Ax \leq b\}$,
denoted by P, where $X=(X_1, \ldots, X_n) \in \Re^n$ is an n-dimensional vector of decision variables taking real values, $c=(c_1, \ldots, c_n) \in \Re^n$ is an n-dimensional vector of coefficients specifying the objective function, $A \in \Re^{m \times n}$ is an m×n-dimensional matrix of coefficients specifying the constraints in the linear program, and $b=(b_1, \ldots, b_m) \in \Re^m$ is an m-dimensional vector of real values.

Let N denote the number of non-zero entries in A. The above LP can be specified by O(n+m+N) real values, and therefore, the size of the above linear program is indicated as O(n+m+N). To simplify the notation, x(i), c(i), A(i,j), and b(j) are used to denote $x_i$, $c_i$, $A_{i,j}$, and $b_j$, respectively.

Similarly, consider a convex program (CP) of the form
Maximize $\{c(x) \text{ subject to } A(x) \leq b\}$,
denoted by C, where $x=(x_1, \ldots, x_n) \in \Re^n$ is an n-dimensional vector of decision variables taking real values, $c: \Re^n \to \Re$ denotes a concave objective function that maps an n-dimensional vector into a real value, $A: \Re^n \to \Re^m$ is an m-dimensional vector of convex functions, each convex function mapping an n-dimensional vector into a real value, and $b=(b_1, \ldots, b_m) \in \Re^m$ is an m-dimensional vector of real values.

While the following discussion applies to both linear and convex programs, for convenience, many of the examples are described with reference to linear programs.

Linear Programming Formulation of the Ad-Revenue Maximization Problem

As an illustrative example, the ad-revenue maximization program is described. Consider a set of search keywords indexed by a set W. Assume, to simplify the description, that each search query corresponds to exactly one keyword in W. A similar model can be formulated when the above assumption is not true; that is, a search query may correspond to a combination of multiple keywords. For each keyword, w∈W, let freq(w) denote the frequency of keyword w; that is, the average number of times keyword w gets searched during a day. Let S denote the number of advertisement slots available to display advertisements for each search query. In general, S may depend on the keyword searched. However, to simplify the description, assume that S is a small constant, typically at most 10. Let B denote the set of advertisers or bidders. For each b∈B, let budget(b) denote the total daily advertisement budget of bidder b. This is the total amount of payment bidder b is willing to expend for placing advertisements, possibly for multiple keywords, during a day.

For keyword w∈W, slot s∈S, and bidder b∈B, let bid(w,s,b) denote the bid bidder b places for displaying an advertisement in slot s for a search query of keyword w. This is the amount of payment bidder b is willing to expend for placing the advertisement in slot s for a search query for keyword w once. Typically, a large fraction of the entries bid(w,s,b) are zero, since a bidder b places a non-zero bid only on keywords w that are relevant to the bidder's interests. Also the value of bid(w,s,b) is larger for slots s that are "more visible" or "at the top". At most, one advertisement can be placed in a single slot for any single search query. Furthermore, at most, one advertisement of any single bidder can be displayed for any single search query. The ad-revenue maximization problem is to decide which advertisements should be placed in which slots for each search query so that the total payment received by the search engine from the bidders is maximized.

To formulate this problem as a linear program, a variable x(w,s,b) is introduced denoting how many times during a day the advertisement of bidder b is displayed in slot s for a search query for keyword w. Naturally, x(w,s,b) is allowed to take non-negative integer values. The integer linear programming formulation of the ad-revenue maximization problem is given as follows.

Maximize $\Sigma\{\text{bid}(w,s,b) \, x(w,s,b) | w \in W, s \in S, b \in B\}$
Subject to
(a) $\Sigma\{\text{bid}(w,s,b) \, x(w,s,b) | w \in W, s \in S\} \leq \text{budget}(b)$ for all b∈B,
(b) $\Sigma\{x(w,s,b) | b \in B\} \leq \text{freq}(w)$ for all w∈W, s∈S,
(c) $\Sigma\{x(w,s,b) | s \in S\} \leq \text{freq}(w)$ for all w∈W, b∈B,
(d) x(w,s,b) is a non-negative integer for all w∈W, s∈S, b∈B.

The objective function is the total payment spent by bidders for all advertisements. The constraints (a) capture the budget constraints of the bidders—the total payment spent by a bidder b is to be at most budget(b), the constraints (b) ensure that at most freq(w) advertisements get displayed for any keyword w and a fixed slot, the constraints (c) ensure that the total number of advertisements of any bidder for a keyword w is at most freq(w), and finally the constraints (d) ensure that the variables x(w,s,b) take non-negative integer values. A linear programming relaxation is obtained by replacing the constraints (d) by the constraints:
(d') $x(w,s,b) \leq 0$ for all w∈W, s∈S, b∈B.

Those skilled in the art will recognize that a fractional solution to the above linear programming relaxation can be rounded to an integral solution to the original integer linear program by randomized rounding. Note that the number of variables and constraints in this program is proportional to the product of the number of keywords and the number of bidders. Those skilled in the art will recognize that one can disregard variables x(w,s,b) for which bid(w,s,b)=0 without loss of generality. Thus, the total number of variables can be assumed to be proportional to the number of non-zero entries in the bidding matrix {bid(w,s,b)}.

Partitioning the Optimization Program into Multiple Sub-Instances

In many applications, the optimization program is too large to be stored and processed on a single compute node. For example, the linear program (LP) arising out of the ad-revenue maximization problem may have several million variables and constraints. Therefore, the instance of the optimization program is to be split into multiple sub-instances and the individual sub-instances are stored and processed on multiple compute nodes. The multiple compute nodes process the sub-instance stored locally, communicate with each other to exchange the values of various quantities, and collectively solve the entire optimization program.

In one example, the following guiding principles are to be followed while deciding how to split the program into multiple sub-instances. First, each sub-instance is to be small enough to be effectively stored and processed on a single compute node. If a sub-instance is too large to be stored or processed on a single compute node, the compute node responsible for that sub-instance will not function effectively and be a computational and storage bottleneck, and in turn slow down the entire computation.

Second, the total communication overhead for exchanging the values of the required quantities between the multiple compute nodes during the computation is to be as small as possible. Low communication overhead leads to effective execution of the overall computation. During execution, the variables and constraints that are tightly coupled are likely to be required to exchange a lot of information. Therefore, the program is split in a manner so that the variables and constraints of those that are tightly coupled are stored on a single compute node as far as possible and while satisfying the first guiding principle. Consider for example, a block of variables that have a large number of non-zero coefficients in a block of constraints. These variables and constraints give rise to a dense sub-matrix of the constraint matrix. Such a sub-matrix is stored on a single compute node, if possible.

Figure 3:
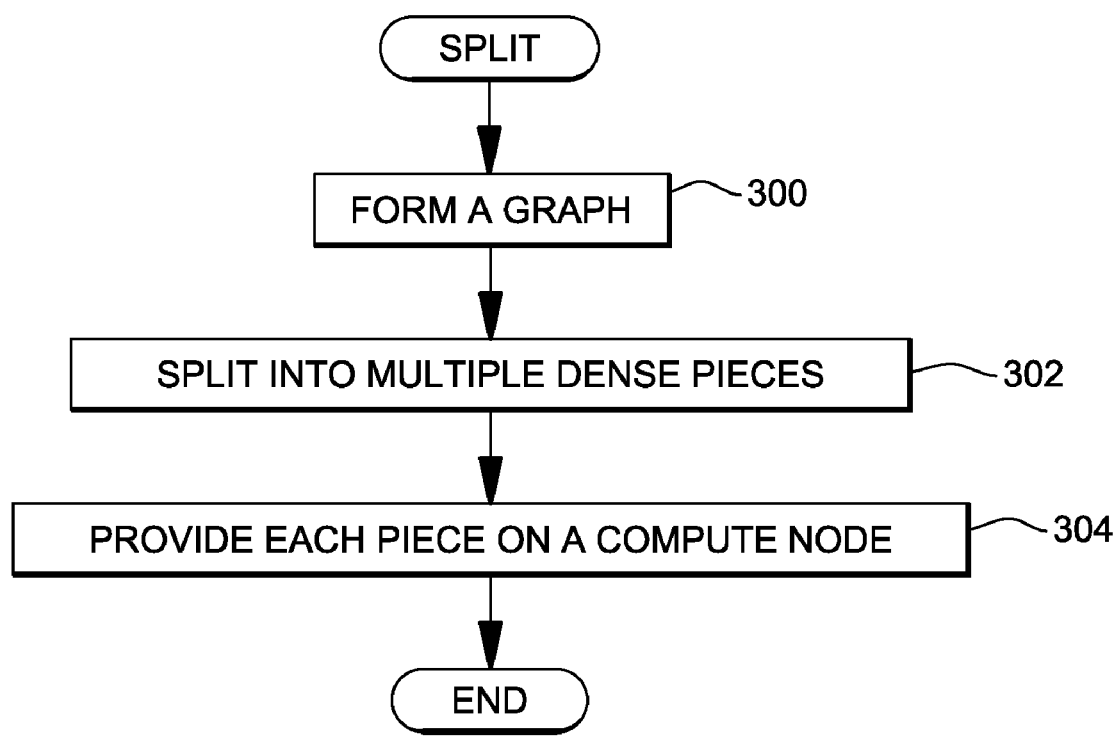
FIG. 3 depicts one embodiment of the logic to split an optimization program into a plurality of sub-instances, in accordance with an aspect of the present invention.

One embodiment of an overview of splitting the program into multiple sub-instances is described with reference to FIG. 3. In one example, it is the master node performing this logic.

Initially, a graph or a network representing the constraint matrix of the entire optimization program is formed, STEP 300. As an example, for each variable and each constraint of the optimization program, a new vertex is added to the graph. Then, for each constraint j and each variable i appearing in the constraint j, a new edge (i,j) is added to the graph.

Then, the graph is split into multiple dense pieces of a relatively small size such that few edges go between the distinct pieces, STEP 302. The size of a piece should be, for instance, small enough to be stored and processed by a single compute node. This can be achieved by a variety of graph partitioning schemes known today, such as, for instance, a balanced graph partitioning technique. With this technique the maximum size of the piece is bound, and communication between the pieces is minimized (or otherwise reduced).

Each piece corresponds to a sub-instance, which is provided to a distinct compute node, so that it can be stored on and processed by that compute node, STEP 304. In one example, if the pieces are small, two or more pieces may be stored on a compute node. The mapping of the sub-instances to compute nodes is stored reliably across node failures.

Further details for splitting a linear program into multiple sub-linear programs, each one to be stored on a distinct compute node are now described. In one embodiment, let K denote the number of compute nodes available. The sub-LP k, denoted by P(k), where $1 \leq k \leq K$, consist of a subset of variables $S(k) \in \{1, \ldots, n\}$ and a subset of constraints $T(k) \in \{1, \ldots, m\}$. In one possible embodiment, assume that the sets $\{S(k), 1 \leq k \leq K\}$ form a partition of $\{1, \ldots, n\}$ and the sets $\{T(k), 1 \leq k \leq K\}$ form a partition of $\{1, \ldots, m\}$; that is, assume that each variable x(i) belongs to exactly one set S(k) and each constraint j belongs to exactly one set T(k). Note that some subsets S(k) or T(k) may be empty. The sub-LP P(k) then consists of the columns corresponding to variables in S(k), the coefficients c(i) for $i \in S(k)$, the rows corresponding to constraints in T(k), and the values b(i) for $i \in T(k)$.

In one embodiment of the splitting, the constraint matrix A is taken as input and a bipartite graph G=(R,C,E) is constructed, where R and C denote the sets of vertices and E denotes the edges between vertices in R and C. The vertices in R are in one-to-one correspondence with m rows of A and the vertices in C are in one-to-one correspondence with n columns of A. An edge $(i,j) \in E$ is introduced if and only if the entry A(i,j) is non-zero; that is, variable j occurs in constraint i. Then, a decision is made as to the number K of parts in which the given instance is to be subdivided. The parameter K may be input by the user, or can be based on the number of compute nodes available for the computation, or can be based on the size of the overall LP and the storage and computational capacities of individual compute nodes.

The vertices V are then partitioned into K parts, each containing a roughly equal number of vertices from $R \cup C$, such that the number of edges in E that go from one part to another is minimized. In another embodiment, the vertices V are partitioned into K parts such that the total degree of vertices inside a part is roughly equal. Such a partition can be computed by any technique for computing a balanced K-way cut. The number of vertices (or their total degree) inside a part k represents the total storage requirement for that part, while the total number of edges going from one part to another represent the total expected communication cost during the execution of the algorithm.

One particular example of splitting a linear program is depicted in FIGS. 4A-4B. Consider the linear program 400 given in FIG. 4A. The constraints and variables in this LP can be partitioned into "blocks" 402, as shown. This particular form of the constraint matrix is called "block-diagonal" where most of the non-zero entries can be arranged to form of a series of blocks along the diagonal of the constraint matrix. The bottom constraints 404 containing many variables are called "coupling constraints". The vertical and horizontal bold lines given in FIG. 4B denote how to split the program into sub-programs. As far as possible, the variables and the constraints belonging to the same block are assigned to the same compute host (Hn). This is done to ensure that the number of edges going from one part to another is as small as possible. For example, the variables $\{x(1), x(2)\}$ and the first three constraints that form the first block are assigned to compute node H1; the variables $\{x(3), x(4)\}$ and the next two constraints that form the second block are assigned to compute node H2; and the variables $\{x(5), x(6), x(7)\}$ in the third block are split into compute nodes H3 and H4, as $\{x(5)\}$ and $\{x(6), x(7)\}$, respectively, due to the load balancing constraint. The coupling constraints at the bottom are split into two hosts H4 and H5.

Continuing, for part k, then S(k) is set to the set of variables corresponding to the vertices in C that belong to part k, and T(k) is set to the set of constraints corresponding to the vertices in R that belong to part k.

In another embodiment, any additional information associated with the variables and constraints may be used. Consider, for example, the ad-revenue maximization problem described above. There are variables x(w,s,b) for keywords $w \in W$, slots $s \in S$, and bidders $b \in B$ for which bid(w,s,b) $\neq 0$. It is expected that bid(w,s,b) is non-zero when bidder b and keyword w belong to the same industry. For example, bidders from the automobile industry, like GM, Ford, Toyota, etc., are likely to bid on keywords like "car dealers" and "used cars"; but are unlikely to bid on keywords like "coffee shops" and "harry potter". Some keywords like "java" have multiple meanings (for example, type of coffee and programming language) and may appear in the biddings from multiple industries. Similarly, some bidders, like Pepsi, may bid not only on keywords related to the food and beverage industry, but also on keywords related to the sports industry, especially if they sponsor a major sporting event. Nevertheless, such keywords and bidders spanning more than one industry amount to a small fraction of the total number of keywords and bidders and can be handled separately. Thus, in general, the bidders and keywords are clustered according to the industry. This induces a natural clustering on variables and constraints in the optimization program. If the sub-instance corresponding to a single industry is too large to be stored on a single compute node, it is split further using the above-mentioned graph partitioning techniques. If on the other hand, there are several small-sized sub-instances, multiple sub-instances can be merged into one and stored on a compute node.

In one embodiment, it is assumed that the splitting itself; that is, the information about which variables and constraints are assigned to which part is stored on a master compute node during the execution of the technique. The master compute node that holds this information (e.g., one or more of the compute nodes of the network) is fault tolerant and this information is not lost throughout the computation.

Iterative Scheme for Computing Near-Optimal Solutions

An overview of one embodiment of the iterative processing of the sub-instances is described with reference to FIG. 5. The iterative scheme (or technique) runs in several iterations. The scheme, at any time during the execution, maintains a candidate solution for the optimization program. The solution may or may not satisfy all the constraints and may or may not be optimum. The solution is an assignment of values to the decision variables. The solution is stored in a distributed manner—the value of a variable is stored on the compute node storing the sub-instance containing the variable. The scheme also maintains certain additional information regarding the current solution. This information captures how tightly various constraints are satisfied by the current solution. It associates a dual variable (a.k.a., a penalty variable) with each constraint in the optimization program. The value of the dual variable is set according to how tightly the corresponding constraint is satisfied and is stored on the compute node storing the corresponding constraint.

Figure 5:
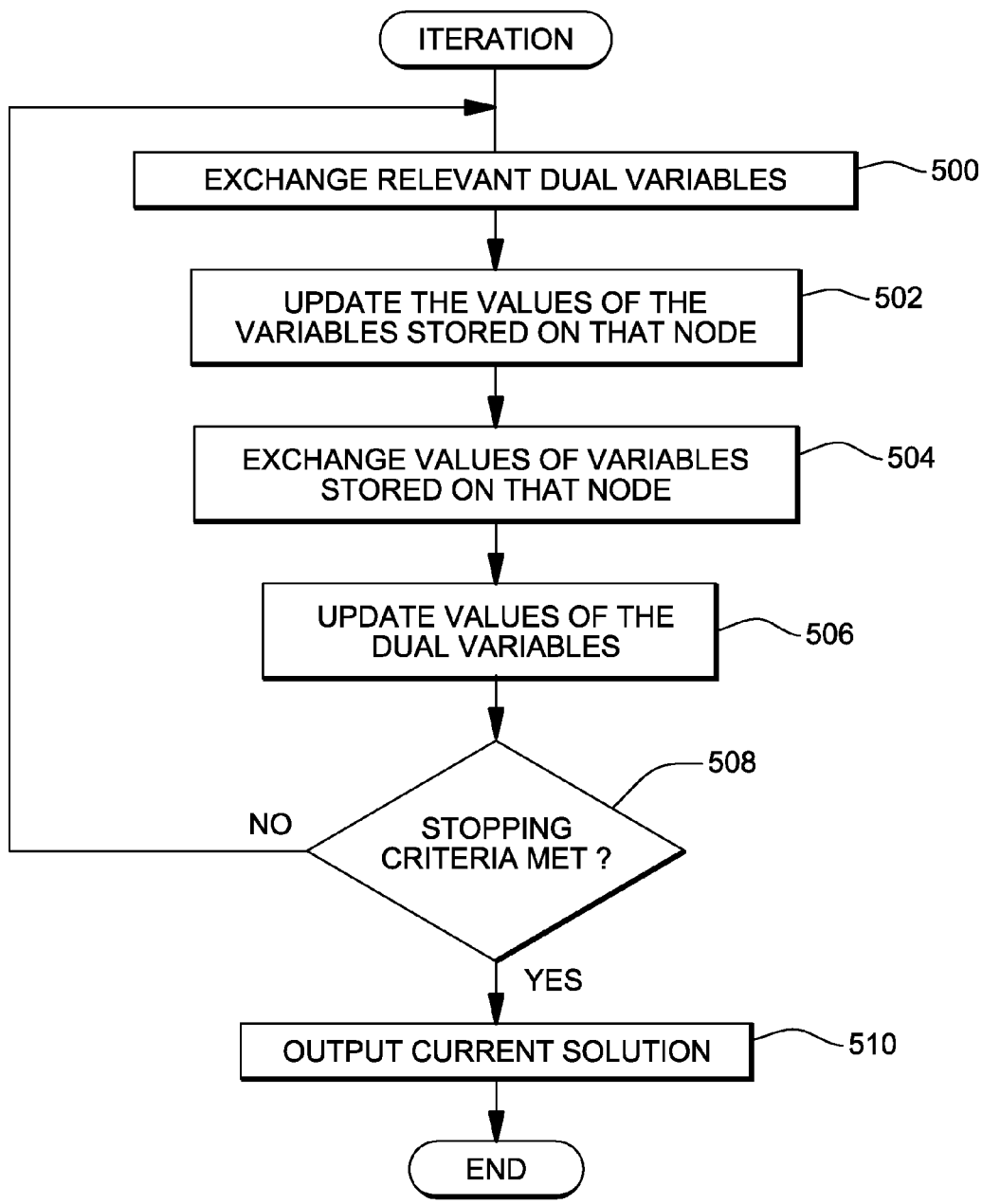
FIG. 5 depicts one embodiment of the logic to iteratively execute a sub-instance, in accordance with an aspect of the present invention.

Referring to FIG. 5, in an iteration, each compute node performs two communication steps and two update steps. In the first communication step, a compute node communicates with other compute nodes to exchange the relevant dual variables associated with the current solution, STEP 500. In the first update step, a compute node updates the values of the variables stored on that node, STEP 502. This update is performed, depending on the dual variables, so that the overall violation of the constraints is lowered or eliminated. In the second communication step, each compute node exchanges the values of the variables stored in that node with other nodes STEP 504. Finally, in the second update step, the values of the dual variables are updated according to how the new solution satisfies the corresponding constraints, STEP 506.

The iterative scheme proceeds until one or more stopping criteria are satisfied, INQUIRY 508. It then outputs its current solution, STEP 510.

Further details regarding one embodiment of an iterative computation of the solution are now described. A compute node, upon activation, loads the information about the variables and the constraints to be stored on that node from the master node. As mentioned above, the master node is assumed to be fault-tolerant and stores the needed information consistently throughout the computation. A compute node corresponding to a sub-program $P(k)$ stores the columns corresponding to variables in $S(k)$ and the rows corresponding to the constraints in $T(k)$. It first initializes the values of the variables $S(k)$ stored on it. In one embodiment, the values of the variables can be initialized to zero. It then associates a dual variable $y(i)$ corresponding to each constraint $i \in T(k)$ stored on it and initializes the values of these dual variables. In one embodiment, it initializes the dual variables to zero.

In another embodiment, it initializes the dual variables as follows: it first identifies the variables present in the constraints in $T(k)$. In case of a linear program, these are the variables $j \in \{1, \ldots, n\}$, such that $A(i,j) \neq 0$ for some constraint $i \in T(k)$. These variables can be identified locally, since the rows of matrix A corresponding to $i \in T(k)$ are stored locally. Then, for each such variable, it identifies the host that stores this variable. This information can be obtained by communicating with the master node. It then communicates with that host to fetch the current value of variable $x(j)$.

In another embodiment of the technique to fetch the values of the variables $x(j)$ appearing in the constraints $i \in T(k)$, the MapReduce computational framework (or another computational framework) can be used. MapReduce is a programming model and multiple implementations, such as Apache Hadoop, exist and are designed for processing and analyzing large data sets. The model involves the specification of two main functions, Map and Reduce.

The Map function reads the input data using an application specific data format, processes the data and generates a set of intermediate <key, value> pairs. The Reduce function operates on a subset of generated intermediate <key, value> pairs, such that the pairs with the same key belong to one subset, and outputs one or more output <key, value> pairs in a sorted order. Further details regarding MapReduce are described in "MapReduce: Simplified Data Processing on Large Clusters," Jeffrey Dean and Sanjay Ghemawat, Proc. 6th OSDI, Dec. 2004, pp. 137-150.

In this example, in the Map phase, each compute node storing a sub-program k' generates the tuples $(j, x(j), i)$ for $j \in S(k')$ and for constraints i that contain variable $x(j)$. Here, index i is treated as a key. In the reduce phase, each compute node storing a sub-program k aggregates the tuples $(j, x(j), i)$ corresponding to the keys $i \in T(k)$. It thus gathers the variables j (along with their values) appearing in the constraint i.

After gathering the desired information, it sets the value $y(i)$ depending on the values of the variables appearing in constraint i. Intuitively, $y(i)$ is set to a large value, if the constraint i is satisfied tightly or violated; and $y(i)$ is set to a small value, if there is a lot of slack in the constraint i. If the constant $b(i)$ is positive, the $i^{th}$ constraint is of the form of the packing constraint: $1/b(i) * \Sigma_j A(i,j) x(j) \leq 1$, and the variable $y(i)$ is set as $$y(i) = 1/b(i) * \exp[\mu(1/b(i) * \Sigma_j A(i,j) x(j) - 1)] \quad (*)$$

where $\exp[.]$ denotes an exponential function and $\mu$ is a fixed parameter. Note that the term $1/b(i) * \Sigma_j A(i,j) x(j) - 1$ in the above expression denotes the relative slack in the constraint i. The slack is non-positive, if the constraint is satisfied; zero, if the constraint is satisfied tightly; and positive, if the constraint is not satisfied. Since the dual variable $y(i)$ depends exponentially on the relative slack, $y(i)$ is small, if there is a lot of slack; and is large, if there is a lot of negative slack. In other embodiments, $y(i)$ can be set as a sufficiently fast growing function of negative slack in constraint i. In case of a convex program, the term $\Sigma_j A(i,j) x(j)$ in the equation (*) is replaced with $A_i(x)$ where $A_i$ denotes the $i^{th}$ convex function in the convex program.

If the constant $b(i)$ is negative, the $i^{th}$ constraint is of the form of the covering constraint: $1/b(i) * \Sigma_j A(i,j) x(j) \leq 1$, and the variable $y(i)$ is set as $$y(i) = 1/|b(i)| * \exp[\mu(1 - 1/b(i) * \Sigma_j A(i,j) x(j))] \quad (**)$$

where $\exp[.]$ denotes an exponential function and $\mu$ is a fixed parameter. Note that the term $1 - 1/b(i) * \Sigma_j A(i,j) x(j)$ in the above expression again denotes the relative slack in the constraint i. The slack is non-positive, if the constraint is satisfied; zero, if the constraint is satisfied tightly; and positive, if the constraint is not satisfied. Since the dual variable $y(i)$ depends exponentially on the relative slack, $y(i)$ is small, if there is a lot of slack; and is large, if there is a lot of negative slack. In other embodiments, $y(i)$ can be set as a sufficiently fast growing function of negative slack in constraint i. Again, in case of a convex program, the term $\Sigma_j A(i,j) x(j)$ in the equation (**) is replaced with $A_i(x)$ where $A_i$ denotes the $i^{th}$ convex function in the convex program.

Again, the technique for computing a near optimal solution to the optimization program is performed in iterations. In each iteration, each compute node k updates the variables in S(k) and then updates the dual variables corresponding to the constraints in T(k).

In one embodiment, to update the variables, the constraints that the variables in S(k) are present in are identified. In case of a linear program, these are the constraints $i\Sigma\{1,\ldots,m\}$, such that $A(i,j)\neq 0$ for some variable $j\Sigma S(k)$. These constraints can be identified locally, since the columns of matrix A corresponding to $j\Sigma S(k)$ are stored locally. Then, for each such constraint i, the host (i.e., that compute node) that stores this constraint is identified. This information can be obtained by communicating with the master node. It then communicates with that host to fetch the current value of dual variable y(i). In another embodiment to fetch the values of the dual variables y(i) containing the variables $j\Sigma S(k)$, the MapReduce framework is used in a manner similar to described above. In the Map phase, each compute node storing a sub-program k' generates the tuples (i, y(i), j) for all $i\Sigma T(k')$ and for all variables j that appear in the constraint i. Here, index j is treated as a key. In the Reduce phase, each compute node storing a sub-program k aggregates the tuples (i, y(i), j) corresponding to the keys $j\Sigma S(k)$. It thus gathers the dual variables i (along with their values) relevant to the variable j.

After gathering the desired information, it updates the variable x(j) depending on the values of the dual variables corresponding to the constraints in which the variable j appears. In the case of the linear program, to update the variable x(j), the constraint corresponding to x(j) is considered in the dual linear program, $\Sigma_i A(i,j)y(i) \geq c(j)$. In one embodiment, if this constraint is satisfied, the value of the variable x(j) is increased, else the value of the variable x(j) is decreased. In another embodiment, the variable x(j) is updated as follows: if the constraint $\Sigma_i A(i,j)y(i) \geq c(j)$ is satisfied according to the current values of dual variables y(i) by a sufficient margin $\alpha>0$; that is, $\Sigma_i A(i,j)y(i) \geq c(j)+\alpha$ holds, the value of the variable x(j) is increased. If the constraint $\Sigma_i A(i,j)y(i) \geq c(j)$ is not satisfied according to the current values of dual variables y(i) by a sufficient margin $\alpha>0$, that is, $\Sigma_i A(i,j)y(i) \leq c(j)-\alpha$ holds, the value of the variable x(j) is decreased. If on the other hand, $c(j)-\alpha \leq \Sigma_i A(i,j)y(i) \leq c(j)+\alpha$ holds, the value of the variable x(j) is not changed.

In case of a convex program, according to one embodiment, a determination is made as to whether to increase or decrease the variables, as follows: consider a potential function $$\phi(x)=c(x)-1/\mu^*\Sigma_i y(i).$$

Here c(x) represents the concave objective function in the convex program. The technique works toward increasing the potential $\phi(x)$. Note that since c(x) is a concave function of x and each y(i) is a convex function of x, the potential $\phi(x)$ is a concave function of x. In each iteration, the gradient (or sub-gradient) $g=\nabla\phi$ with respect to x is computed. In one embodiment, if $g(j)>0$; that is, the entry g(j) corresponding to variable x(j) is positive, the variable x(j), is increased; and if $g(j)<0$, the variable x(j) is decreased. In another embodiment, if $g(j)>\alpha$, the variable x(j) is increased; if $g(j)<-\alpha$, the variable x(j) is decreased; and if $-\alpha \leq g(j) \leq \alpha$, the value of the variable x(j) is not changed.

Responsive to a decision to increase the value of some variable x(j), according to one embodiment, the increase is performed as follows: if the current value of x(j) is positive and larger than $\delta$ where $\delta$ is a pre-determined small constant, increase x(j) by a multiplicative factor; that is, set x(j) to $x(j)(1+\beta)$ where $\beta>0$ is a pre-determined small constant. If the current value of x(j) is positive and smaller than $\delta$, set x(j) to $\delta$. If the current value of x(j) is negative and smaller than $-\delta$, increase x(j) by a multiplicative factor; that is, set x(j) to $x(j)(1-\beta)$. If the current value of x(j) is negative and larger than $-\delta$, set x(j) to 0.

Similarly, responsive to a decision to decrease the value of a variable x(j), the decrease is performed as follows, in one embodiment: if the current value of x(j) is positive and larger than $\delta$, decrease x(j) by a multiplicative factor; that is, set x(j) to $x(j)(1-\beta)$. If the current value of x(j) is positive and smaller than $\delta$, set x(j) to 0. If the current value of x(j) is negative and smaller than $-\delta$, decrease x(j) by a multiplicative factor; that is, set x(j) to $x(j)(1+\beta)$. If the current value of x(j) is negative and larger than $-\delta$, set x(j) to $-\delta$. In another possible embodiment, the values can be increased or decreased by a small additive constant.

In another embodiment, a compute node storing sub-program k can update the variables in S(k) simultaneously by solving a smaller optimization program induced on the variables in S(k) and constraints in T(k), as described below. For example, for a variable $j\in S(k)$, let $\Delta x(j)$ denote the increase in x(j) to be performed in this iteration. Assume that $\Delta x(j)=0$ for all $j \notin S(k)$. In case of a linear program, solve the following sub-program:

Maximize $\Sigma\{\Delta x(j)(c(j)-\Sigma\{A(i,j)y(i)|i \notin T(k)\})|j\in S(k)\}$
subject to the constraints that
$-\max \{|\beta x(j)|,\delta\} \leq \Delta x(j) \leq \max \{|\beta x(j)|,\delta\}$ for all $j\in S(k)$
and the final solution $x+\Delta x$ satisfies the constraints in T(k) that do not contain variables outside S(k).

In case of a convex program, replace the above objective function by:

Maximize $\nabla \phi \Delta x$.

Finally, variables x(j) are updated to $x(j)+\Delta x(j)$ for all $j\in S(k)$.

After updating the variables $j\in S(k)$, the compute node k in each iteration updates the values of the dual variables y(i) corresponding to constraints $i\in T(k)$ depending on the new values of the variables x(j) appearing in constraints i, as given in equations (*) and (**) above.

Stopping Criteria

The iterations of different compute nodes may or may not be synchronous. Each compute node continues the iterations until one or more stopping criteria are met. In one embodiment, there may not be any stopping criteria at all—the computation may go on in an uninterrupted manner as long as needed. In another embodiment, the stopping criterion can be based on the total number of iterations. A compute node may stop after completing a pre-determined number of successful iterations. In yet another embodiment, the stopping criterion can be based on one or more conditions regarding the quality of the current solution, as described below. One condition may be based on the value of the objective function, $\Sigma_j c(j)x(j)$, in case of a linear program, or c(x) in case of a convex program. Such a condition may get satisfied, if the value of the maximization objective function exceeds some pre-determined threshold. Another condition may be based on the total violation of the constraints. Note that the dual variable y(i) captures the extent to which constraint i is violated—larger y(i) implies high violation and smaller y(i) implies low violation. Similarly, $\Sigma_i y(i)$ captures the total extent to which the constraints are violated—larger sum implies high total violation and smaller sum implies low total violation. Such a condition may get satisfied when one or more y(i) or the sum comes down below a pre-determined threshold.

Handling Additions, Deletions, and Changes in Variables and Constraints

Figure 6A:
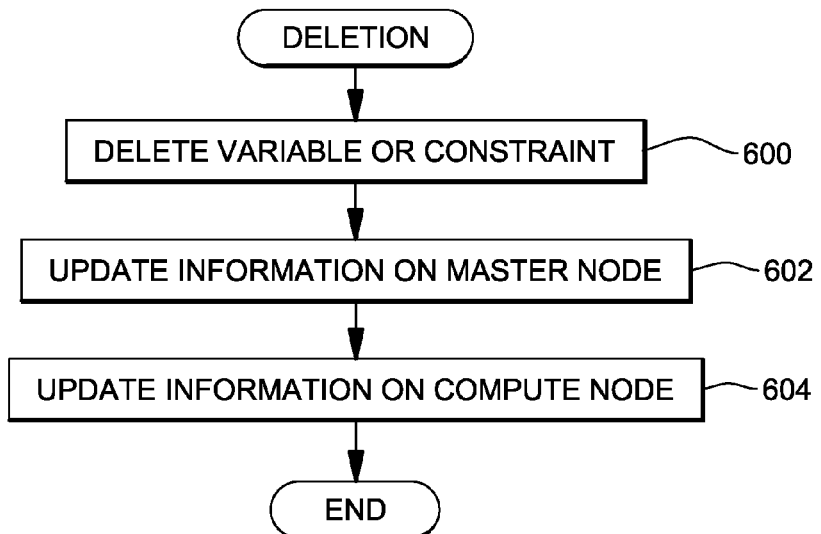
FIG. 6A depicts one embodiment of the logic to dynamically delete a variable or constraint from an optimization program, in accordance with an aspect of the present invention.

In accordance with an aspect of the present invention, deletion, addition or other changes in the variables and constraints are supported. For example, as shown in FIG. 6A, when a variable or a constraint is deleted from the optimization program, STEP 600, the information stored on the master node is updated to reflect that the variable or the constraint is no longer a part of the program, STEP 602. Next, the information stored on the compute nodes storing part k for which S(k) contains the deleted variable or T(k) contains the deleted constraint is updated to reflect the deletion, STEP 604.

If due to the deletion, the size of a sub-instance becomes smaller than a pre-determined threshold, a sub-instance may be merged with another sub-instance. In one embodiment, two smallest sized sub-instances may be merged into one and this information is updated on the master node and the compute nodes involved in the merge.

Figure 6B:
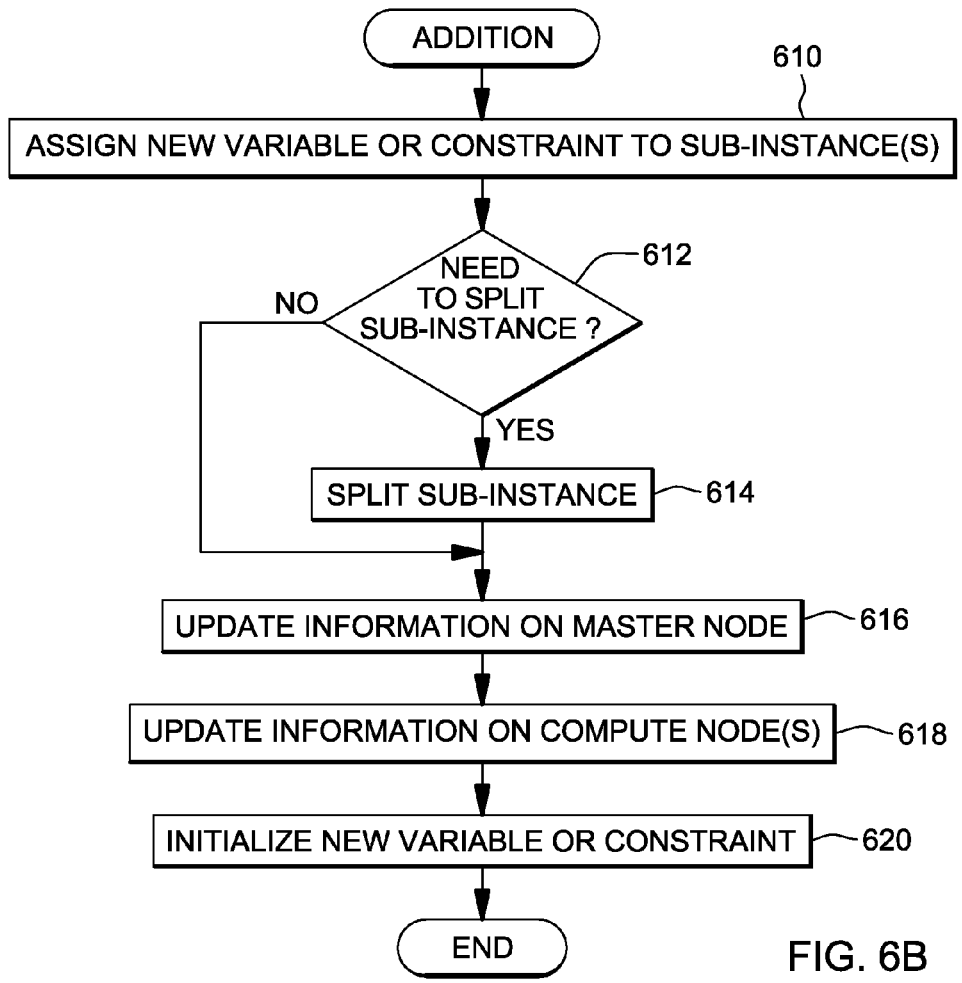
FIG. 6B depicts one embodiment of the logic to dynamically add a variable or constraint to an optimization program, in accordance with an aspect of the present invention.

In a further example, when a new variable or a constraint is added to an optimization program, as shown in FIG. 6B, it is assigned to one or more sub-instances, STEP 610. In one embodiment, the new variable or constraint is assigned to the smallest sized sub-instance. In another embodiment, the new variable or constraint is assigned to the sub-instance that would reduce (e.g., minimize) the number of constraints that span more than one sub-instance. If a sub-instance is to be split due to the size constraint, INQUIRY 612, the split is performed using the graph partitioning approach described herein, STEP 614.

In response to completing this assignment and optional splitting, the information on the master node and the compute nodes involved in the assignment and the splitting is updated to reflect the addition of the new variable or constraint, STEPs 616, 618. The new variable or constraint is initialized, as described herein, STEP 620.

Other modifications, including the change to information regarding a variable or a constraint, are also supported. For example, in the linear program, the coefficients in the column corresponding to a variable may change or the coefficients in the row corresponding to a constraint may change. In such a case, this information is updated on the compute nodes storing part k for which S(k) contains such a variable or T(k) contains such a constraint.

As described herein, problems representing resource assignment tasks and modeled as programs are solved, optimally or near-optimally, in a distributed manner by effectively storing and processing parts of the program on different compute nodes connected by a communications interface.

To be able to solve large-scale programs, the program is split into two or more sub-instances and each sub-instance is stored and processed on a distinct compute node (or small sub-instances may be combined on one node, or a large sub-instance may be split amongst nodes). A distributed technique is provided for processing the sub-instances on the individual compute nodes and for communicating intermediate results between the multiple compute nodes, so that the overall computed solution converges to an optimal or near-optimal solution quickly.

The technique does not need to restart the entire computation due to temporary failure of a compute node or the communications infrastructure or when the optimization programming instance changes. The data corresponding to a newly recovered compute node is initialized and then the computation is continued from the current solution and converges to an optimal or near-optimal solution quickly. Further, dynamically changing optimization programs are supported. When a new variable, a new constraint or a new objective function arrives, the technique decides how to update one or more sub-instances while satisfying the above objectives.

Figure 7:
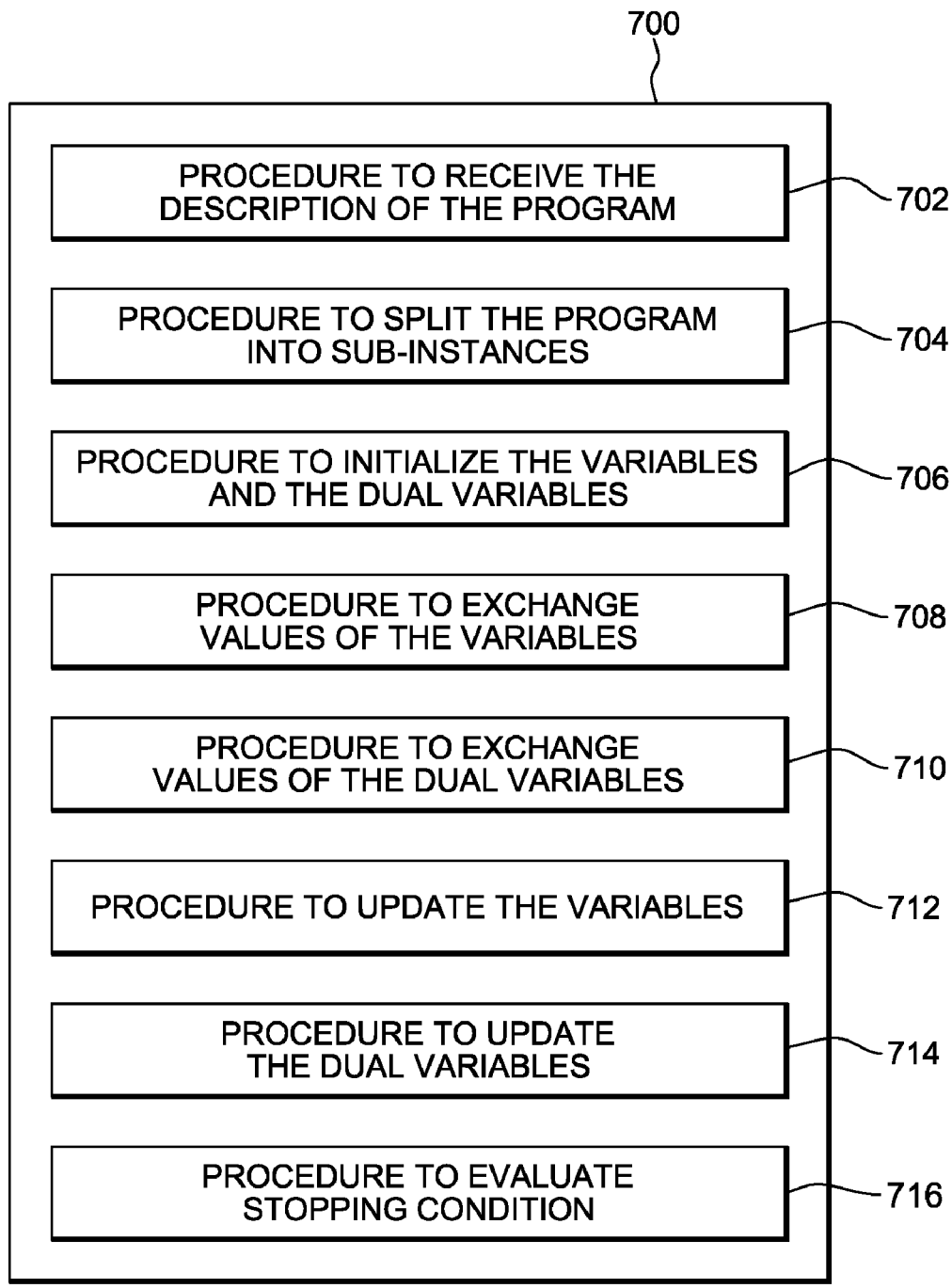
FIG. 7 is one example of various software components used in one or more aspects of the present invention.

As shown in FIG. 7, to solve an optimization problem modeled as an optimization program, various procedures 700 may be used. These procedures, include, in one example, a procedure to receive the description of the program 702, a procedure to split the program into sub-instances 704, a procedure to initialize the variables and the dual variables 706, a procedure to exchange values of the variables 608, a procedure to exchange values of the dual variables 710, a procedure to update the variables 712, a procedure to update the dual variables 714, and a procedure to evaluate the stopping condition 716. These procedures are executed on one or more of the compute nodes. Although various procedures are described herein, more, less or different procedures may be used without departing from the spirit of the present invention. These procedures are only provided as examples.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
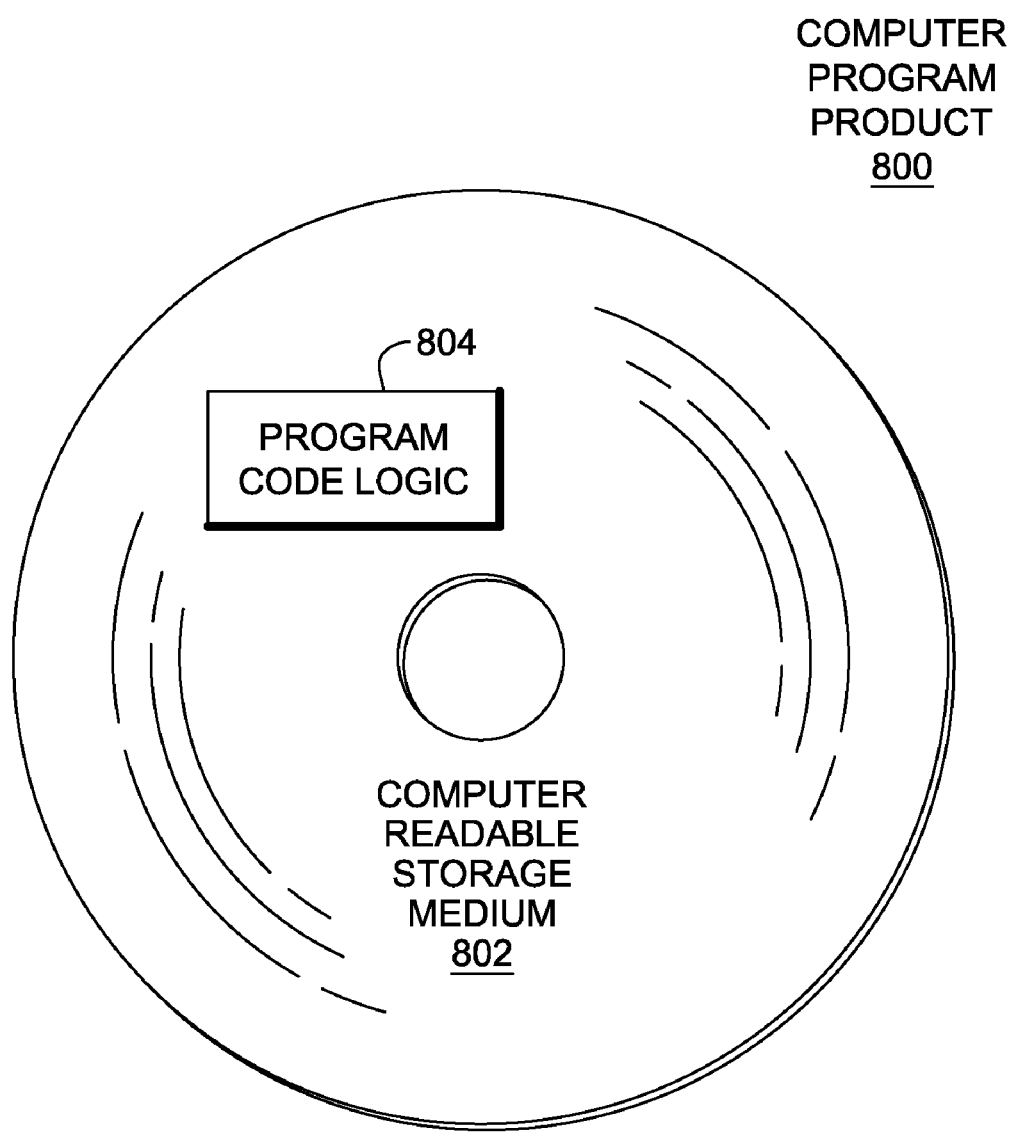
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, the network of nodes can include additional nodes, and the nodes can be the same or different from those described herein. Also, many types of communications interfaces may be used. Further, other types of programs and/or other optimization programs may benefit from one or more aspects of the present invention, and other resource assignment tasks may be represented. Resource assignment tasks include the assignment of physical resources. Moreover, although in one example, the partitioning minimizes communication costs and convergence time, in other embodiments, the cost and/or convergence time may be otherwise reduced, lessened, or decreased.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating data processing in a distributed computing environment, said method comprising:
   partitioning, by a processor executing on a node of the distributed computing environment, a program that represents a resource assignment task into a plurality of sub-instances, the partitioning reducing communication costs between the sub-instances and reducing convergence time for the program; and
   assigning the plurality of sub-instances to a plurality of nodes of the distributed computing environment, the plurality of nodes to execute the plurality of sub-instances to obtain a result for the resource assignment task by, in part, associating penalty variables with constraints of the resource assignment task, the penalty variables indicating levels of satisfaction of the constraints of the resource assignment task based on current values of variables of those constraints, and by exchanging among multiple nodes of the plurality of nodes values of the penalty variables;
   iteratively executing by a node of the plurality of nodes the sub-instance assigned to that node, the iteratively executing providing a sub-result usable to obtain the result for the resource assignment task;
   wherein the iteratively executing comprises:
     obtaining, from at least one other node of the plurality of nodes, one or more current values of one or more penalty variables, the one or more penalty variables indicating one or more levels of satisfaction of one or more constraints assigned to one or more other sub-instances of the at least one other node, wherein the one or more constraints comprise at least one variable of the sub-instance assigned to the node;
     updating at least one value of the at least one variable of the sub-instance assigned to the node based, at least in part, on at least one value of the one or more current values of the one or more penalty variables obtained from the at least one other node; and
     providing to the at least one other node the updated at least one value of the at least one variable.

2. The method of claim 1, wherein the obtaining comprises:
   identifying the one or more constraints comprising the at least one variable of the sub-instance assigned to the node;
   identifying the at least one other node assigned the one or more other sub-instances comprising the identified one or more constraints; and
   reading the one or more current values of the one or more penalty variables from the identified at least one other node.

3. The method of claim 2, wherein the providing provides the updated at least one value of the at least one variable to the identified at least one other node to facilitate updating the current values of the one or more penalty variables to updated values of the one or more penalty variables.

4. The method of claim 1, wherein the iteratively executing comprises iteratively executing the sub-instance until a predefined criteria is satisfied, and wherein, in each iteration, the iteratively executing comprises exchanging data with one or more other nodes executing sub-instances.

5. The method of claim 4, wherein the exchanging is performed using MapReduce.

6. The method of claim 1, further comprising:
   determining a failure has occurred with at least one of a node of the plurality of nodes or a communications link involved in executing a sub-instance; and
   resuming execution of the sub-instance absent a restart of the program.

7. The method of claim 1, further comprising:
   modifying a sub-instance being executed; and
   continuing with on-going computation within the sub-instance, responsive to the modifying.

8. The method of claim 1, wherein the partitioning comprises using a balanced graph partitioning technique, wherein a maximum size of a sub-instance is bound.

9. The method of claim 1, wherein the assigning comprises assigning each sub-instance to a different node of the plurality of nodes.

10. A system of facilitating data processing in a distributed computing environment, said system comprising:

a processor executing on a node of the distributed computing environment to partition a program that represents a resource assignment task into a plurality of sub-instances, the partitioning reducing communication costs between the sub-instances and reducing convergence time for the program; and a plurality of nodes of the distributed computing environment to execute the plurality of sub-instances to obtain a result for the resource assignment task by, in part, associating penalty variables with constraints of the resource assignment task, the penalty variables indicating levels of satisfaction of the constraints of the resource assignment task based on current values of variables of those constraints, and by exchanging among multiple nodes of the plurality of nodes values of the penalty variables;

wherein a node of the plurality of nodes iteratively executes the sub-instance assigned to that node, the iteratively executing providing a sub-result usable to obtain the result for the resource assignment task;

wherein the node that iteratively executes:

obtains, from at least one other node of the plurality of nodes, one or more current values of one or more penalty variables, the one or more penalty variables indicating one or more levels of satisfaction of one or more constraints assigned to one or more other sub-instances of the at least one other node, wherein the one or more constraints comprise at least one variable of the sub-instance assigned to the node;

updating at least one value of the at least one variable of the sub-instance assigned to the node based, at least in part, on at least one value of the one or more current values of the one or more penalty variables obtained from the at least one other node; and provides to the at least one other node the updated at least one value of the at least one variable.

11. The system of claim 10, wherein a failure has occurred with at least one of a node of the plurality of nodes or a communications link involved in executing a sub-instance, and wherein execution of the sub-instance resumes absent a restart of the program.

12. A computer program product for facilitating data processing in a distributed computing environment, the computer program product comprising:

a non-transitory computer readable storage medium readable by a processor and storing instructions for execution by the processor for performing a method comprising:

partitioning a program that represents a resource assignment task into a plurality of sub-instances, the partitioning reducing communication costs between the sub-instances and reducing convergence time for the program; and assigning the plurality of sub-instances to a plurality of nodes of the distributed computing environment, the plurality of nodes to execute the plurality of sub-instances to obtain a result for the resource assignment task by, in part, associating penalty variables with constraints of the resource assignment task, the penalty variables indicating levels of satisfaction of the constraints of the resource assignment task based on current values of variables of those constraints, and by exchanging among multiple nodes of the plurality of nodes values of the penalty variables;

iteratively executing by a node of the plurality of nodes the sub-instance assigned to that node, the iteratively executing providing a sub-result usable to obtain the result for the resource assignment task;

wherein the iteratively executing comprises:

obtaining, from at least one other node of the plurality of nodes, one or more current values of one or more penalty variables, the one or more penalty variables indicating one or more levels of satisfaction of one or more constraints assigned to one or more other sub-instances of the at least one other node, wherein the one or more constraints comprise at least one variable of the sub-instance assigned to the node;

updating at least one value of the at least one variable of the sub-instance assigned to the node based, at least in part, on at least one value of the one or more current values of the one or more penalty variables obtained from the at least one other node; and providing to the at least one other node the updated at least one value of the at least one variable.

13. The computer program product of claim 12, wherein the method further comprises:

determining a failure has occurred with at least one of a node of the plurality of nodes or a communications link involved in executing a sub-instance; and resuming execution of the sub-instance absent a restart of the program.

14. The computer program product of claim 12, wherein the method further comprises:

modifying a sub-instance being executed; and continuing with on-going computation within the sub-instance, responsive to the modifying.

* * * * *